(No Model.)
G. F. LITTLEJOHN.
FRUIT JAR.
No. 248,866. Patented Nov. 1, 1881.
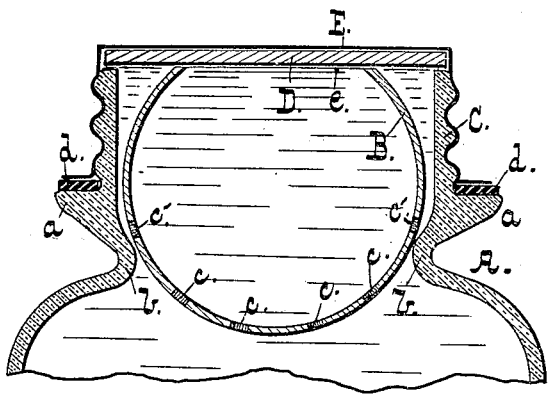
WITNESSES.
W. A. Bertram
[signature]
INVENTOR
Geo. F. Littlejohn.
BY
[signature]
ATTORNEY.
N. PETERS. Photo-Lithographer. Washington, D. C.

UNITED STATES PATENT OFFICE.

GEORGE F. LITTLEJOHN, OF WARRENTON, NORTH CAROLINA.

FRUIT-JAR.

SPECIFICATION forming part of Letters Patent No. 248,866, dated November 1, 1881.

Application filed April 30, 1881. (No model.)

*To all whom it may concern:*

Be it known that I, GEORGE F. LITTLEJOHN, of Warrenton, Warren county, State of North Carolina, have invented certain new and useful Improvements in Fruit-Jars; and I hereby declare the same to be fully, clearly, and exactly described, as follows, reference being had to the accompanying drawing, in which the device is illustrated in central vertical sectional view.

My invention has reference to devices for immersing fruit below the level of the sirup in fruit-jars and maintaining it there, in order to prevent the molding which otherwise results.

Devices of this class have heretofore consisted generally of perforated disks or diaphragms attached to the lid of the jar, or else arranged to rest either upon the fruit or upon lugs in the neck.

The object of my invention is to provide an immersing device and sirup-fountain of such form as to be constructed at a low cost, and to be readily removed and replaced when it is desired to wholly or partly empty the jar.

To these ends I provide a glass ball having a portion of its upper surface cut away and provided with perforations in its lower portion and adapted to rest upon an annular stricture or series of lugs in the neck of the jar.

In the drawings, A is the jar, having the usual threaded neck, C, and exterior annular seat, $a$, for the rubber or equivalent gasket $d$. The sheet-metal cover E has a thread spun on it to engage with that of the jar-neck, and is provided at its lower rim with a flange to compress the gasket $d$.

D is the usual glass cover. Inside the neck is a stricture or series of lugs, $b$, upon which rests the immersing device B. It consists of a glass ball or shell having a portion of its surface cut away, as at $e$, forming an open flat top, against which the plate D rests. The lower portion of the ball has a number of perforations, $c$, of which one or more, $c'$, are above the stricture $b$, and serve to drain the space between the ball and neck.

In operation, the jar is filled in the usual way, and the ball is placed in the neck, as shown. Its lower portion projects into the jar, holding the fruit below the surface of the sirup, while its interior and the remaining space within the neck constitute a reservoir for sirup designed to meet any tendency on the part of the fruit to absorb sirup after sealing the jar. The open top of the ball affords facility for the insertion of the finger or a spoon to withdraw the ball, and serves also to maintain the ball in one position by the contact therewith of the cover D.

Instead of cutting away a portion of the ball, it may be flattened and provided with one or more apertures.

The balls may be very cheaply blown, and answer the desired ends most satisfactorily.

What I claim is—

1. As a new article of manufacture, the perforated ball cut away on one side, as set forth.

2. In combination with the jar and cover, the perforated ball having an enlarged perforation, the edges of which are adapted to rest against the cover, as set forth.

3. In combination with the jar having stricture $b$, the ball B, adapted to rest thereon, and provided with perforations above and below the stricture, as set forth.

4. In combination with the jar having cover and stricture, as set forth, the ball B, provided with a perforated lower portion and an opening in its upper portion, whereby its rotation is prevented, as set forth.

GEO. F. LITTLEJOHN.

Witnesses:
R. D. WILLIAMS,
J. C. GITTINGER.